United States Patent [19]

Kubo et al.

[11] Patent Number: 4,504,700
[45] Date of Patent: Mar. 12, 1985

[54] INPUT DEVICE

[75] Inventors: Yoshizo Kubo; Ikuo Utagawa, both of Miyagi, Japan

[73] Assignee: Alps Electric Co., Ltd., Tokyo, Japan

[21] Appl. No.: 510,369

[22] Filed: Jul. 1, 1983

[30] Foreign Application Priority Data

Jul. 3, 1982 [JP] Japan .......................... 57-100116[U]

[51] Int. Cl.³ ............................................. G08C 21/00
[52] U.S. Cl. ....................................................... 178/18
[58] Field of Search ............... 178/18, 19, 20; 338/99, 338/114

[56] References Cited

U.S. PATENT DOCUMENTS 3,624,619 11/1971 Ambroslo .............................. 178/18
4,164,622 8/1979 Pobgee .................................. 178/18
4,208,648 6/1980 Naumann .............................. 178/18

Primary Examiner—Stafford D. Schreyer
Attorney, Agent, or Firm—Guy W. Shoup; Gerard F. Dunne

[57] ABSTRACT

A new and efficient input device of an electrode contact type which has a high mechanical strength and durability and can assure accurate detection of coordinates. The input device comprises an elastic flexible insulator spacer having a conductive element embedded therein which may be a gauze of thin wires of a good conductive material knit into the form of a grid. Upon depression of an insulator protective sheet, a portion of the spacer under the sheet is deformed to expose the conductive element downwardly therefrom thereby to short-circuit the element to a resistor layer under the spacer.

4 Claims, 4 Drawing Figures (4,504,700)

INPUT DEVICE

BACKGROUND OF THE INVENTION

This invention relates to an input device for use with a display device such as a cathode ray tube (CRT) as a computer terminal, and more particularly to a touch type input device wherein a position of a surface of a panel at which it is pressed by a touch pen or the like is detected.

Various systems have been proposed so far for this type of input devices, for example, an electrode contact type in which membrane switches are contained, a photo matrix type wherein a light source and a photo-sensor are used in combination such that a coordinate of an obstacle on a light path may be detected thereby, a pressure type wherein pressure by touch is detected, and a surface elastic wave type wherein a coordinate is detected by a propagation time of a surface wave along a panel surface. Among these types of systems, the electrode contact type is simpler in construction and is reduced in cost comparing with the remaining types. However, a coordinate input device of the conventional electrode contact type includes therein keyboard switches of a membrane type which employs a transparent plastic film which has evaporated or sputtered thereto a membrane of a metal material such as Ag, Pd and so on, or a membrane of a metal oxide such as $In_2O_3$ and so on over a predetermined area. Accordingly, an input device of this type is disadvantageous in that it has a relatively high resistance and a rather low mechanical strength so that the available percentage becomes low and the life becomes short. Further, some membrane electrodes have fine powder of a conductive metal material dispersed in a synthetic resin material. But, dispersion of such metal powder is not always uniform, and hence, accurate detection of coordinates is sometimes obstacled and satisfactory strength cannot be attained.

SUMMARY OF THE INVENTION

Accordingly, it is an object of the present invention to provide an input device which is simple in construction, can be produced at a low cost, has a high mechanical strength and durability, and can assure accurate detection of coordinates.

According to the present invention, there is provided an input device, comprising: an insulator sheet; a resistor layer formed uniformly on said insulator sheet; a plurality of terminal leads connected to opposite ends of said resistor layer; an elastic, flexible insulator spacer on said resistor layer having a conductive element embedded therein; and an insulator protective sheet mounted in overlapping relationship to cover said insulator spacer; a position in coordinates being detected from a potential associated with a position of contact between said conductive element and said resistor layer.

Other objects, features and advantages of the present invention will become apparent to those skilled in the art from a reading of the following detailed description of a preferred embodiment, taken in conjunction with the accompanying drawings.

DETAILED DESCRIPTION OF THE INVENTION

Figure 1:
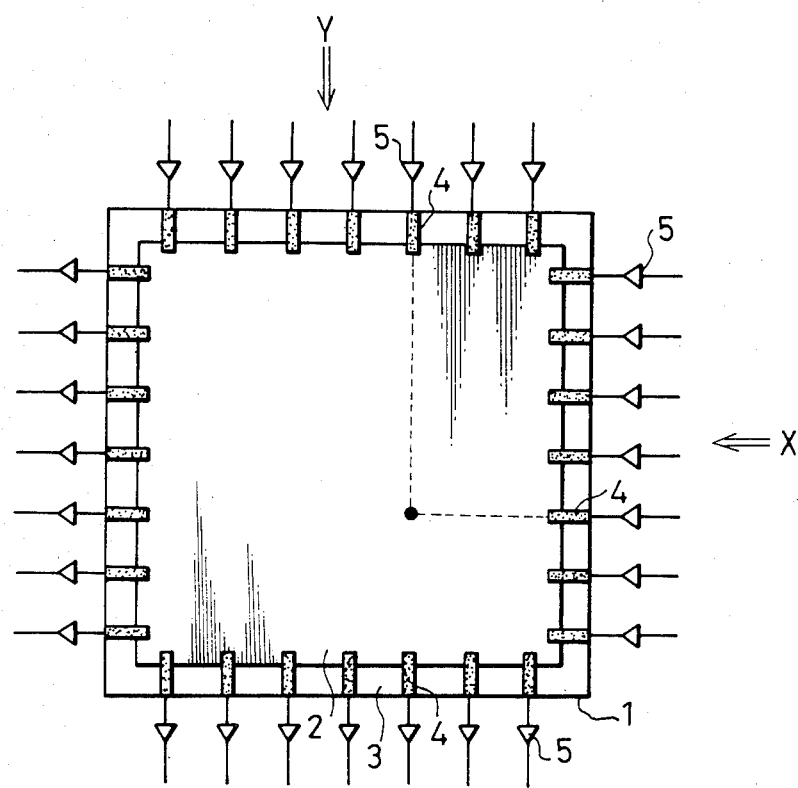
FIG. 1 is a plan view of an input device according to the present invention, with a part thereof omitted.

Referring to FIG. 1, there is shown a plan view of an embodiment of an input device of the present invention with upper insulater spacer and insulater protective sheet removed therefrom.

The embodiment is constructed as an input device for a two coordinate display device of the type wherein coordinates in directions along the X and Y axes are detected. The input device includes an insulator sheet 1 substantially of a regular square configuration to which is applied a resistor layer 2 of a conductive paint which is made by suitably mixing carbon and any other conductive material or materials. Opposite ends of the resistor layer 2 in the direction along the X axis and also in the direction along the Y axis are connected to a plurality of terminal leads 4 which are provided at terminal leading portions 3 of the insulator sheet 1. The terminal leads 4 are arranged in equally spaced relationship in the directions along the X and Y axes, and a fixed voltage is applied across opposing ones of the terminal leads 4 in each of the directions along the X and Y axes. The terminal leads 4 are individually connected to diodes 5 to define directions of flows of electric currents in the directions along the X and Y axes.

Figure 2:
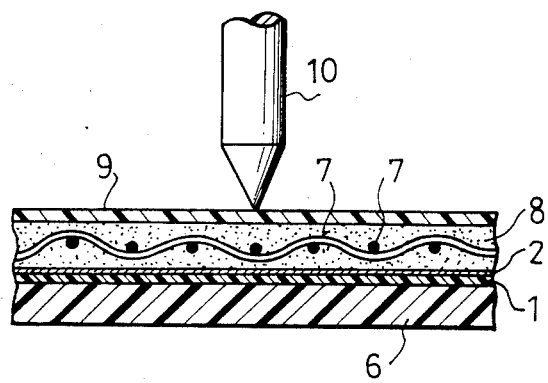
FIG. 2 is a cross sectional view of part of the input device.

Referring now to FIG. 2 which is a sectional view of the embodiment of the invention, the insulator sheet 1 having the resistor layer 2 applied thereto is fixedly mounted on a rigid substrate 6 while the resistor 2 has placed thereon an insulator 8 in which a conductive member 7 knit into the form of a grid is buried or embedded. The conductive member 7 is constituted from a gauze, knit into the form of a grid, either of thin or fine wires of copper or bronze plated with gold or of thin wires of a good conductive metal material which are coated with a carbon paint of a low resistance. Preferably, the diameter of wires is between 0.05 to 0.2 mm and the distance between adjacent wires, which extend in parallel relationship, is smaller than the distance between adjacent terminal leads 4. The insulator spacer 8 is made of an elastic and flexible material containing foams therein, such as a foamed silicon material. In a normal position not depressed, the insulator spacer 8 retains the conductive member 7 in a plane therewithin to isolate the conductive member 7 from upper and lower surfaces thereof, but when depressed, it will be readily deformed to expose the conductive member 7 from the lower surface thereof. Opposite ends of the conductive member 7 (i.e., opposite ends of individual thin wires of the gauze) extend externally from opposite end faces of the insulator spacer 8 and are electrically connected to one end of a circuit including the resistor layer 2. The upper surface of the insulator spacer 8 is covered with a flexible insulator protective sheet 9 made of a polyurethane material.

Figure 3:
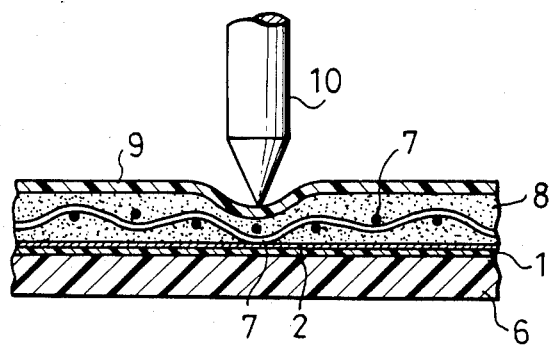
FIG. 3 is a similar cross sectional view of part of the input device in a partially depressed condition.
Figure 4:
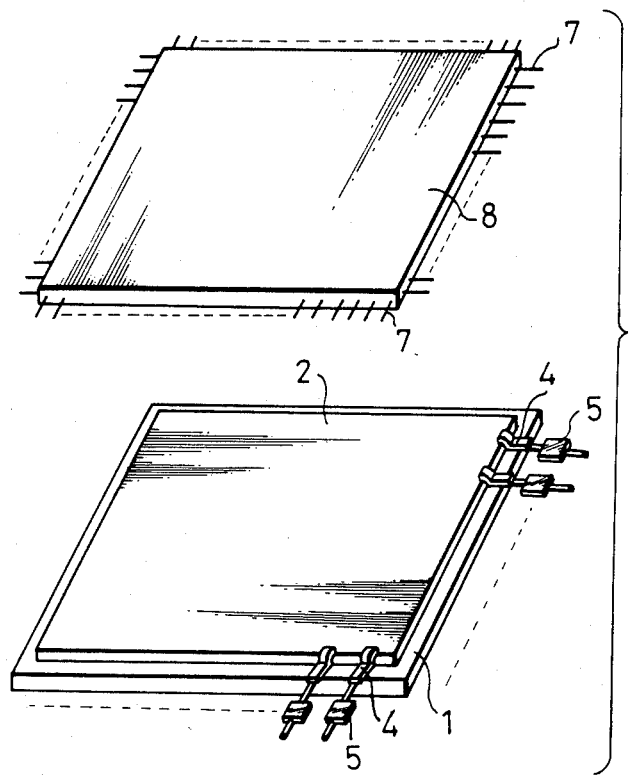
FIG. 4 is a partly fragmentary perspective view showing the entirety of the input device.

In the input device of such a construction as described above, it is understood that a predetermined voltage is applied between the opposing terminal leads 4 in the direction along the X axis as in FIG. 1. In this condition, if the insulator protective sheet 9 is depressed at a point thereon by a pressing member 10 which has a pointed end as seen in FIGS. 2 and 3, the conductive member 7 is pressed down thereby so that a portion of the insulator spacer 8 below the conductive member 7 will be rather expanded therearound and will become very thin to cause the conductive member 7 to be substantially short-circuited to the resistor layer 2. In this way, a potential at the depressed point in the direction along the X axis is detected to discriminate the X coordinate of the depressed point.

Similarly, if a predetermined voltage is applied between the opposing terminal leads 4 in the direction along the Y axis, the depressed point by the pressing member will be discriminated in accordance with a potential in the direction along the Y axis. Thus, the depressed point is discriminated in the coordinates of the X and Y axes.

In this embodiment, a voltage is applied to opposite ends of the single resistor layer 2 in each of the two different directions in order to detect potentials at a depressed point in the directions along the X and Y axes. Accordingly, voltages applied in both axial directions are always scanned in every minute fraction of time in order that coordinates in both axial directions may be detected during each depressing operation. Reverse current upon such scanning is prevented by means of the diodes 5 connected to the terminal leads 4.

Also in this embodiment, a gauze knit into the form of a grid is employed for the conductive member 7. This enables the conductive member to have a prescribed strength even in an input device of a minimized thickness, and even where the elasticity of the insulator spacer 8 is low, the conductive member 7 can be deformed satisfactorily in a condition retained within the insulator spacer 8.

However, it is to be understood that the conductive member 7 is not limited to a gauze but any suitable material such as a thin film, a member including a number of belt-formed elements, and so on, may be employed for the conductive member 7 only if it meets the requirements of mechanical strength, weight, conductivity and so on.

It is to be noted that, while the insulator spacer 8 and the insulator protective sheet 9 in the embodiment are formed into separate bodies, they can be made integral with each other by melting and hardening the surface of the insulator spacer 8.

It is understood that various modifications and improvements may be made in the input device described without departing from the scope of the invention.

What is claimed is:

1. An input device, comprising: an insulator sheet (1); a resistor layer (2) formed uniformly on said insulator sheet; a plurality of terminal leads (4) connected to opposite ends of said resistor layer; an elastic, flexible insulator spacer (8) on said resistor layer having a conductive element (7) embedded therein; and an insulator protective sheet (9) mounted in overlapping relationship to cover said insulator spacer; a position in coordinates being detected from a potential associated with a position of contact between said conductive element and said resistor layer.

2. An input device according to claim 1, wherein said conductive element embedded in said insulator spacer is a gauze of thin wires of a good conductive metal material which are knit into the form of a grid.

3. An input device according to claim 1, wherein said insulator spacer is made of a foamed silicon material.

4. An input device according to claim 1, further comprising a diode connected to each of said terminal leads.

* * * * *